Sept. 5, 1967 H. R. OTTO, JR 3,339,347
FILTER

Filed Oct. 5, 1965 2 Sheets-Sheet 1

INVENTOR.
HERBERT R. OTTO, JR
BY Charles Marks
ATTORNEY

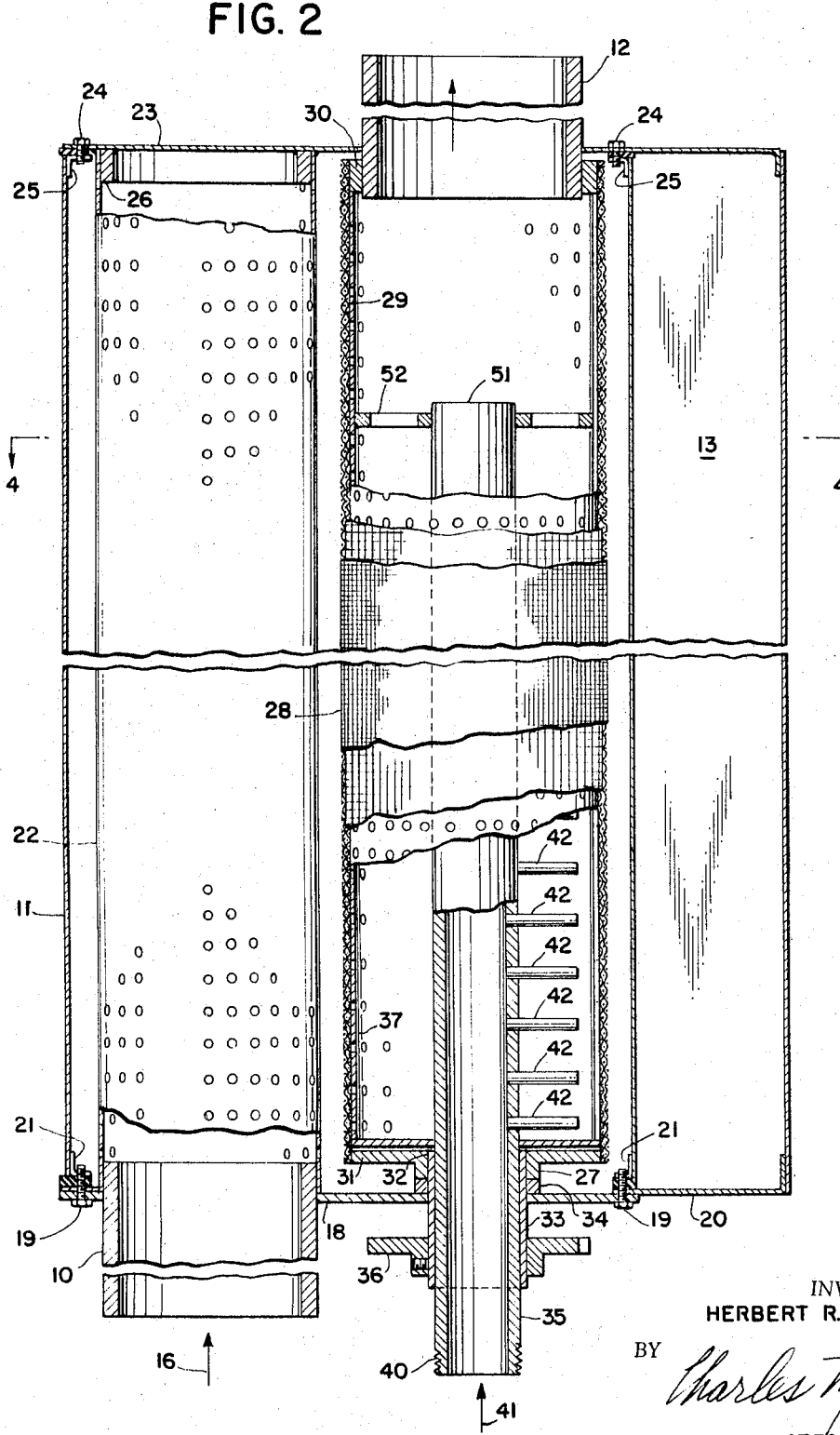

United States Patent Office 3,339,347
Patented Sept. 5, 1967

3,339,347
FILTER
Herbert R. Otto, Jr., 4 Dickson Drive,
Westfield, N.J. 07090
Filed Oct. 5, 1965, Ser. No. 493,035
1 Claim. (Cl. 55—290)

ABSTRACT OF THE DISCLOSURE

An apparatus for filtering exhaust gases from truck diesel engines. A revolvable wire screen removes carbon and other particles from the exhaust gases and is disposed in the path of one or more air currents which blow the particles into a removable bin permitting their discard. The device is contained in a housing, suitably connectable to the exhaust manifold of a truck diesel engine or other source of exhaust gases; and permits discharge of the filtered gases to the atmosphere.

This invention relates to filters.

It is an object of this invention to provide a filter capable of removing particles of carbon and other matter from gases such as exhaust gases which issue from diesel engines employed in trucks.

Another object of the invention is to provide a filter of the character described which has convenient means for removing accumulations of the particles which have been filtered out of such gases.

A further object of the present invention is to provide a filter of the character described which can be easily installed in operation.

A still further object of the invention is to provide a filter of the character described which is of sturdy and economical design.

Other objects and advantages of the present invention will become apparent from the following discussion as read in connection with the accompanying drawings.

In the drawings:

FIGURE 2 is a cross-sectional elevational view of the said embodiment of the invention;

Throughout the various views, similar numerals are employed to designate similar parts of the described form of the invention.

The present invention employs a revolvable wire screen to entrap particles to be removed from a gas, after which entrapment, the screen is disposed in the path of one or more currents of air which urge the particles into a removable container from whence they can be discarded. The invention can be conveniently connected to the source of such gas, such as the exhaust manifold of a truck diesel engine and after filtration, said gas may be exhausted to the surrounding atmosphere.

Figure 1:
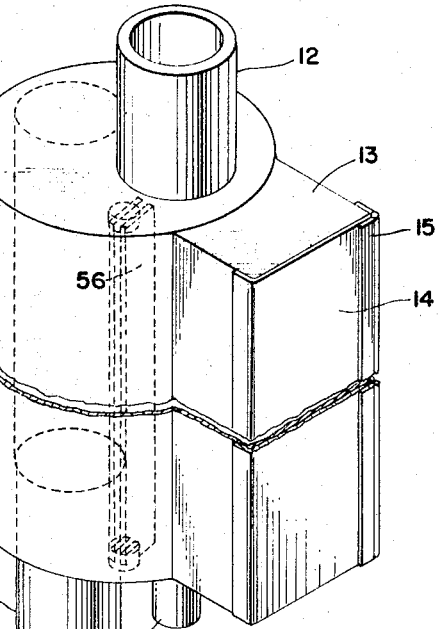
FIGURE 1 is an isometric view of one embodiment of the present invention.

Thus, as shown in FIGURE 1 of the drawings, one embodiment of the present invention comprises an inlet pipe 10 projecting from a cylindrical housing 11, which is also provided with an outlet pipe 12 projecting therefrom. A generally rectangular bin 13 also depends radially from said housing 11 and is provided with a door 14. Said door 14 and bin 13 are connected by a suitable hinge 15, whereby said door 14 may be opened to permit access to the interior of the bin 13, as desired, or may be disposed in a closed position, as depicted in FIGURES 1 and 2 of the drawings, thereby retaining the contents of said bin 13.

The inlet pipe 13 may receive an exhaust gas containing particles of carbon and other matter to be filtered. Such exhaust gas may arise from the manifold of a truck diesel engine and may be conducted to the inlet pipe 13 by suitable means, such as a tube or conduit (not shown).

Figure 4:
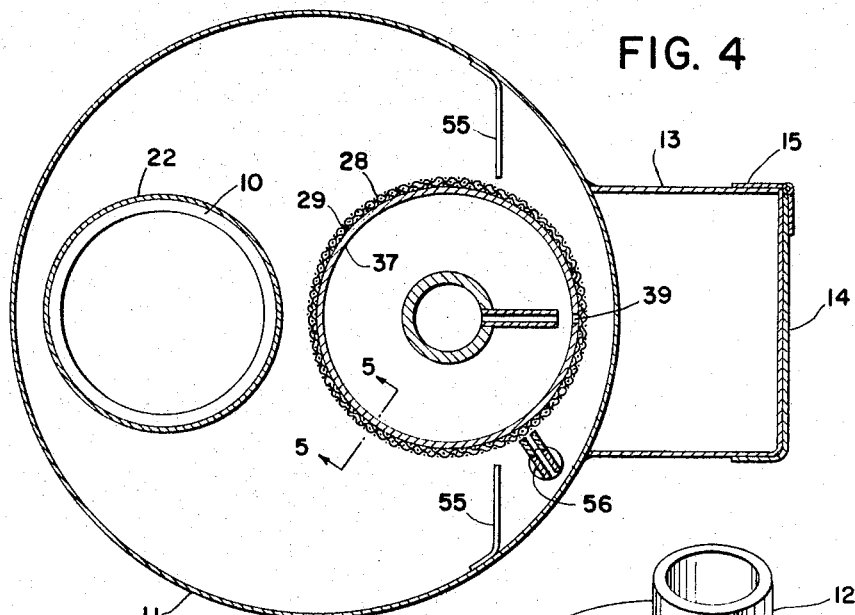
FIGURE 4 is a cross-sectional view taken about the line 4—4 of FIGURE 2.

The path of such exhaust gas through the present invention may best be noted by reference to FIGURES 2 and 4 of the drawings. Thus, the gas to be filtered will enter the inlet pipe 10 in the direction indicated by the arrow 16. The inlet pipe 10 extends through a rigid plate 18 removably affixed as by screws 19 to the base 20 of the rectangular bin 13 and to suitable brackets 21 depending from the lower portion of the housing 11.

The inlet pipe 10 is engaged with a perforated tube 22 which depends from the lower surface of a plate 23 affixed, as by screws 24, to suitable brackets 25 depending from the upper portion of the housing 11. A ring 26 depends from the lower surface of the plate 23 and is engaged with the perforated tube 22.

The exhaust gas travels from the inlet pipe 10 into the perforated tube 22 and thence through an outer tube 28 composed of wire mesh or screening and welded or otherwise affixed to an intermediate tube 29 composed of wire mesh or screening disposed on the internal periphery of said outer tube 28. The intermediate tube 29 is affixed to upper and lower stiffening rings 30, 31 which are disposed upon the internal periphery of said intermediate tube 29 at the upper and lower ends thereof. The lower stiffening ring 31 is provided with a hollow cylindrical extension 27 having an axial aperture 32 which receives a bushing 33 projecting through a hollow cylindrical spacer 34 seated in contact with the cylindrical extension 27 and the rigid plate 18.

Said bushing 33 is slidably engaged with the external periphery of an air intake tube 35, the bushing 33 being rotatable with respect to said air intake tube 35, thereby rotating the outer tube 28 and intermediate tube 29 disposed therein.

Figure 3:
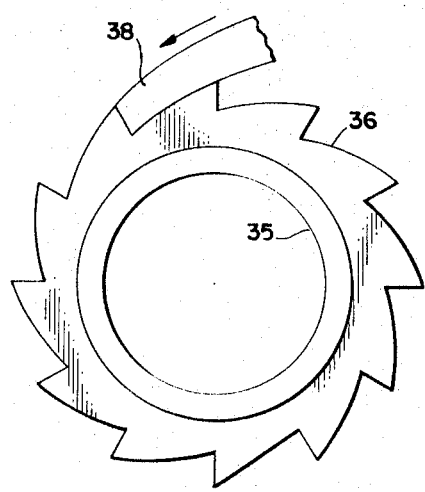
FIGURE 3 is a plan view of a ratchet employed with the said embodiment of the invention.

Such movement may be accomplished by suitable rotating means such as a ratchet 36 (see FIGURE 3) affixed to the external circumferential periphery of the bushing 33 and engageable with a suitable click 38.

The ratchet 36 may be rotated by the click 38 by suitable hydraulic or pneumatic means (not shown) which may be actuated by the brake pedal (not shown) in the cab of the truck on which the filter is employed. Thus, said ratchet 36 may be rotated through a pre-determined angular interval by each depression of such brake pedal.

Figure 5:
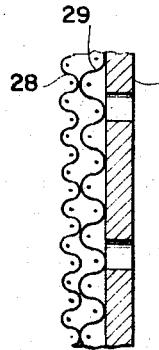
FIGURE 5 is a fragmentary cross-sectional view taken about the line 5—5 of FIGURE 4.

It will be observed that the rotation of the ratchet 36 will induce a corresponding rotation of the outer tube 28 and of the intermediate tube 29 disposed therein. It will also be seen in FIGURES 2 and 5 that a hollow, perforated inner tube 37 is disposed within the intermediate tube 29, said perforated inner tube 37 depending from the upper stiffening ring 30 and including a longitudinal slot 39. The intermediate tube 29 is slidably engaged with the external circumferential periphery of the perforated inner tube 37, thereby permitting said intermediate tube 29 and outer tube 28 to rotate with respect to the perforated inner tube 37.

The air intake tube 35 is provided with a thread 40 whereby it may be connected to a suitable source of compressed air, such as a pump (not shown), which will urge such air into the air intake tube 35 in the direction of the arrow 41. Such air will then escape through a plurality of nozzles 42 which depend from the air intake tube 35 and communicate with the interior thereof. Said nozzles 42 are aligned with the longitudinal slot 39 and by virtue of this disposition, they direct the escaping air through said slot 39 and the mesh or screening of the intermediate and outer tubes 29, 28.

The rectangular bin 13 is also aligned with the longitudinal slot 39, so that the air directed therethrough by the nozzles 42 is urged into said rectangular bin 13.

In this way, it will be seen that the air emerging from the nozzles 42 will blow particles of carbon or other matter which have accumulated on the intermediate and outer tubes 29, 28 and which are disposed in front of the slot 39, into the rectangular bin 13.

Such intermediate and outer tubes 29, 28 will accumulate said particles by filtering them from the exhaust gas passing therethrough in the manner previously noted, after which, the exhaust gas will travel through the perforated inner tube 37, from whence it will escape by way of the outlet pipe 12 into the surrounding atmosphere.

The upper end 51 of the air intake tube 35 is closed and said air intake tube 35 is suitably supported axially of the perforated inner tube 37 by a stiffening member 52 engaged with said perforated inner tube 37.

After the particles on the intermediate and outer tubes 29, 28 have been blown from the region adjacent to the longitudinal slot 39 into the rectangular bin 13, said intermediate and outer tubes 29, 28 may be rotated in the manner previously noted, so as to confront said nozzles 42 with another region of said tubes 29, 28 where the same removal of accumulated particles may be repeated.

To prevent accidental accumulations of such particles in regions within the housing 11 other than those adjacent to the bin 13, a pair of baffles 55 (see FIGURE 4) depend from the internal periphery of said housing 11 and extend to the vicinity of the outer tube 28.

It will also be observed that, if desired, a suitable longitudinal brush 56 depending from the plates 18, 23 may be engaged with the outer tube 28, thereby removing excessive particle accumulations therefrom and permitting them to fall upon the plate 18.

From time to time, the door 14 may be opened to permit removal of particles which have been blown into the bin 13 or which have accumulated in its vicinity.

It will be seen from the foregoing that the exhaust gas emerging from the outlet pipe 12 will be free from the particles previously contained therein and that the filter will provide a convenient means for their removal.

The embodiment of the invention illustrated and described hereinabove has been selected for the purpose of clearly setting forth the principles involved. It will be apparent, however, that the present invention is susceptible to being modified in respect to details of construction, combination and arrangement of parts which may be resorted to without departure from the spirit and scope of the invention as claimed.

I claim:

In a filter for removing particles of matter entrained in a gas, the combination comprising:

(a) a housing including a vertical cylinder provided with circular closure members engaged with the upper and lower ends of said vertical cylinder;

(b) a vertical gas intake pipe projecting through the circular closure member engaged with the lower end of said vertical cylinder, said gas intake pipe also communicating with a perforated tube disposed within said vertical cylinder and depending from the circular closure member engaged with the upper end of said vertical cylinder;

(c) a vertical gas outlet pipe disposed laterally of said perforated tube and projecting through the circular closure member engaged with the upper end of said vertical cylinder;

(d) a plurality of concentric tubular screens rotatably engaged with said gas outlet pipe and resting upon annular means surmounting the circumferential periphery of a bushing projecting through the closure member engaged with the lower end of said vertical cylinder;

(e) an air inlet pipe projecting through the circular closure member engaged with the lower end of said vertical cylinder and extending into said vertical cylinder;

(i) said air inlet pipe being received within said bushing;

(ii) the air inlet pipe being disposed axially of said concentric tubular screens;

(iii) that portion of the air inlet pipe within the vertical cylinder being provided with a plurality of vertically aligned nozzles extending radially of said air inlet pipe and directed at said concentric tubular screens;

(f) an inner perforated tube disposed concentrically of said air inlet pipe and depending from said gas outlet pipe, whereby gas entering said gas intake pipe may travel through said first-mentioned perforated tube, said tubular screens and inner perforated tube and may emerge from said gas outlet pipe, the said particles being entrapped by said tubular screens;

(i) said inner perforated tube being provided with a longitudinal slot aligned with said nozzles, said slot being disposed between said nozzles and said tubular screens, whereby air emerging from said nozzles will be directed through said slot and tubular screens to remove particles of matter accumulated therein;

(ii) said tubular screens being slidably engaged with said inner perforated tube;

(g) ratchet means depending from said bushing, whereby said tubular screens may be rotated with respect to said slot, thereby bringing successive portions of said tubular screens into the vicinity of said slot;

(h) a rectangular bin depending from said vertical cylinder and disposed adjacent to said slot, whereby particles blown from said tubular screens by said nozzles will be received within said bin;

(i) a door hingeably engaged with said rectangular bin, whereby access may be had to the interior thereof for removal of particles accumulated therein.

References Cited

UNITED STATES PATENTS

| | | | |
|---|---|---|---|
| 1,002,618 | 9/1911 | Winkler | 55—290 |
| 1,177,262 | 3/1916 | O'Donnell | 55—431 X |
| 1,288,110 | 12/1918 | Miller | 55—290 X |
| 1,862,839 | 6/1932 | Brelsford et al. | 55—302 X |
| 2,500,747 | 3/1950 | Ellis | 55—302 X |
| 2,559,428 | 7/1951 | Hersey | 55—294 |
| 2,639,779 | 5/1953 | Glanzer | 55—442 X |
| 2,765,048 | 10/1956 | Hersey | 55—283 X |
| 2,787,119 | 4/1957 | Giambruno. | |
| 2,792,907 | 5/1957 | Replogle | 55—290 |
| 2,929,503 | 3/1960 | Armbruster et al. | |
| 3,023,447 | 3/1962 | Senne | 55—378 X |
| 3,060,663 | 10/1962 | Morris et al. | 55—302 |
| 3,195,296 | 7/1965 | Janson | 55—361 X |
| 3,212,239 | 10/1965 | Maestrelli | 55—302 X |

FOREIGN PATENTS

| | | |
|---|---|---|
| 643,015 | 5/1928 | France. |
| 914,096 | 6/1954 | Germany. |

HARRY B. THORNTON, *Primary Examiner.*

D. TALBERT, *Assistant Examiner.*